United States Patent
Kawashima et al.

(10) Patent No.: US 8,642,230 B2
(45) Date of Patent: Feb. 4, 2014

(54) ELECTRODE-MEMBRANE-FRAME ASSEMBLY FOR FUEL CELL, POLYELECTROLYTE FUEL CELL AND MANUFACTURING METHOD THEREFOR

(75) Inventors: Tsutomu Kawashima, Nara (JP); Norihiko Kawabata, Osaka (JP); Toshihiro Matsumoto, Osaka (JP); Atsushi Murata, Osaka (JP); Takashi Morimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 624 days.

(21) Appl. No.: 12/136,312

(22) Filed: Jun. 10, 2008

(65) Prior Publication Data
US 2008/0305384 A1    Dec. 11, 2008

(30) Foreign Application Priority Data

Jun. 11, 2007   (JP) ................. 2007-153732
May 15, 2008   (JP) ................. 2008-128624

(51) Int. Cl.
*H01M 2/14*         (2006.01)

(52) U.S. Cl.
USPC ........................... 429/508; 429/507; 429/511

(58) Field of Classification Search
USPC ................. 429/12, 30, 34, 35, 507, 508, 511
See application file for complete search history.

(56) References Cited

U.S. PATENT DOCUMENTS

| | | | |
|---|---|---|---|
| 5,464,700 A * | 11/1995 | Steck et al. ................ | 429/483 |
| 6,610,435 B1 | 8/2003 | Maruyama et al. | |
| 6,840,969 B2 | 1/2005 | Kobayashi et al. | |
| 2003/0150162 A1 * | 8/2003 | Inagaki et al. ................ | 48/195 |
| 2004/0096730 A1 | 5/2004 | Kuroki et al. | |
| 2004/0234831 A1 | 11/2004 | Kobayashi et al. | |
| 2007/0048585 A1 * | 3/2007 | Kino ................ | 429/34 |
| 2007/0248863 A1 * | 10/2007 | Pawlik et al. ................ | 429/30 |
| 2007/0264557 A1 * | 11/2007 | Kobayashi et al. ............. | 429/36 |
| 2008/0280178 A1 * | 11/2008 | Spink et al. ................ | 429/26 |

FOREIGN PATENT DOCUMENTS

| | | | |
|---|---|---|---|
| CN | 1977412 A | 6/2007 | |
| EP | 1624511 A1 * | 2/2006 | ............. H01M 8/10 |
| EP | 1624512 A2 * | 2/2006 | ............. H01M 8/10 |
| JP | 9-147891 | 6/1997 | |

(Continued)

OTHER PUBLICATIONS

Chinese Office Action issued Apr. 23, 2012 in corresponding Chinese Application No. 200810210377.4.

*Primary Examiner* — Zachary Best
(74) *Attorney, Agent, or Firm* — Wenderoth, Lind & Ponack, L.L.P.

(57) ABSTRACT

An electrode-membrane-frame assembly for a polyelectrolyte fuel cell including of a membrane electrode assembly, a first frame body which has a separator-side surface on which a sealing member for sealing between the member and one separator and a membrane-side surface located on one surface of the peripheral edge portion of the membrane electrode assembly and is formed of a thermoplastic resin material, and a second frame body that has a separator-side surface on which a sealing member for sealing between the member and the other separator and a membrane-side surface located on the other surface of the peripheral edge portion of the membrane electrode assembly and is formed of a thermoplastic resin material and fitted to the first frame body holding the peripheral edge portion of the membrane electrode assembly between the second frame body and the first frame body.

8 Claims, 16 Drawing Sheets

(56) References Cited

FOREIGN PATENT DOCUMENTS

| | | |
|---|---|---|
| JP | 2001-102072 | 4/2001 |
| JP | 2001-155745 | 6/2001 |
| JP | 2003-68319 | 3/2003 |
| JP | 2003068319 A * | 3/2003 |
| JP | 2004-319461 | 11/2004 |
| JP | 2006-252811 | 9/2006 |
| JP | 2006-310288 | 11/2006 |
| WO | 02/43172 | 5/2002 |
| WO | WO 2006040994 A1 * | 4/2006 ............. H01M 8/02 |

* cited by examiner

ELECTRODE-MEMBRANE-FRAME ASSEMBLY FOR FUEL CELL, POLYELECTROLYTE FUEL CELL AND MANUFACTURING METHOD THEREFOR

BACKGROUND OF THE INVENTION

1. Field of the Invention

The present invention relates to solid polyelectrolyte fuel cells, and, in particular, to the structure of a fuel cell electrode-membrane-frame assembly and a manufacturing method therefor.

2. Description of the Related Art

The solid polyelectrolyte fuel cell (hereinafter occasionally referred to as "PEFC") is an apparatus for concurrently generating electric power and heat by electrochemically reacting a fuel gas that contains hydrogen with an oxidizer gas that contains oxygen such as air.

The most typical PEFC is constructed of a polyelectrolyte membrane with a gasket of a sealing member for sealing gas at the peripheral edge portion, an electrolyte membrane-electrode assembly (hereinafter referred to as "MEA") constituted by joining an anode to one surface of the electrolyte membrane and joining a cathode to the other surface of the electrolyte membrane, and an anode side conductive separator plate and a cathode side conductive separator plate interposing the MEA therebetween. A gas feeding part for feeding the fuel gas and the oxidizer gas to the anode and the cathode, respectively, is formed at the peripheral edges of a center portion put in contact with the MEA inside the separator plates.

One of the important problems of PEFC is to improve the use efficiency of the fuel gas and the oxidizer gas. In concrete, MEA sometimes generates a gap between the inner edge of the gasket and the outer edge of an electrode layer (an electrode layer of the anode or cathode) for the reasons of restrictions and so forth on the processing steps. When such a gap exists, the fuel gas and the oxidizer gas leak to the gap in PEFC operation, and the leaking fuel gas and oxidizer gas are discharged to the outside while being scarcely exposed to the MEA. This consequently incurs reductions in the use efficiency of the fuel gas and the oxidizer gas, i.e., reductions in the efficiency (generating efficiency) of the PEFC. In order to solve the problems as described above, for example, Japanese unexamined patent publication No. JP 2001-155745 A proposes an MEA of a structure such that a gasket formed of a prescribed resin material for covering and sealing the outer edge of the electrode layer of the MEA is integrated with the MEA. Various other structures of the gasket integrated with the MEA or relevant techniques are proposed (refer to, for example, International Publication Pamphlet No. 2002/043172, JP 2006-310288 A, JP 2001-102072 A, JP 2006-252811 A, U.S. Patent Laid-Open No. 2004/0096730, U.S. Pat. Nos. 6,610,435, 6,840,969 and U.S. Patent Laid-Open No. 2004/0234831).

SUMMARY OF THE INVENTION

However, for example, in the structure of the gasket integrated with the MEA as represented by JP 2001-155745 A, time and labor are necessary for a process for placing a resin material to uniformly fit the material close to the peripheral edge portion of the electrode layer without excess nor deficiency in the MEA, and this is at least inappropriate for mass production. Furthermore, in the structure of JP 2001-155745 A, manifolds of the fuel gas and the oxidizer gas fed to the MEA are formed outside the separator plates, and this therefore also causes a harmful effect that the fuel cell constituted by stacking a plurality of electric cell modules cannot be made compact.

In order to solve the above problems, for example, a structure such that a frame body is formed of a resin material to hold the peripheral edge portion of the polyelectrolyte membrane in the MEA, a gasket is formed on the surface of the frame body, and manifolds are formed at the frame can be considered.

However, various methods can be considered as to the structure for making the frame body hold the MEA and how the frame is manufactured. In particular, the MEA is a comparatively expensive member, and it is demanded to achieve high yield (productivity) in fuel cell manufacturing.

Accordingly, it is an object of the present invention to improve the above issues and provide an electrode-membrane-frame assembly capable of achieving high yield in manufacturing a solid polyelectrolyte fuel cell and a manufacturing method therefor as well as a polyelectrolyte fuel cell having an electrode-membrane-frame assembly and a manufacturing method therefor.

A further object of the invention is to provide an electrode-membrane-frame assembly for a fuel cell capable of achieving reliable sealing in an electric cell module where a membrane electrode assembly is placed between one separator and a manufacturing method therefor as well as a polyelectrolyte fuel cell having an electrode-membrane-frame assembly and a manufacturing method therefor.

In accomplishing the objects, the invention is constructed as follows.

According to a first aspect of the present invention, there is provided an electrode-membrane-frame assembly for a polyelectrolyte fuel cell, the assembly comprising:

a membrane electrode assembly;

a first frame body placed on one surface of a peripheral edge portion of the membrane electrode assembly; and a second frame body which is placed on the other surface of the peripheral edge portion of the membrane electrode assembly and holds the peripheral edge portion of the membrane electrode assembly between the first frame body and the second frame body, the assembly constituting an electric cell module in the fuel cell by being held between one pair of separators.

According to a second aspect of the present invention, there is provided the electrode-membrane-frame assembly for a fuel cell as defined in the first aspect, further comprising:

holding means for releasably holding the membrane electrode assembly by the first frame body and the second frame body.

According to a third aspect of the present invention, there is provided the electrode-membrane-frame assembly for a fuel cell as defined in the second aspect, wherein the holding means has a fitting structure to releasably fit at least one of the first and second frame bodies to the other.

According to a fourth aspect of the present invention, there is provided the electrode-membrane-frame assembly for a fuel cell as defined in the second aspect, wherein the holding means is an engagement member to releasably engage the first frame body with the second frame body.

According to a fifth aspect of the present invention, there is provided the electrode-membrane-frame assembly for a fuel cell as defined in the first aspect, wherein the membrane electrode assembly comprises a polyelectrolyte membrane and one pair of electrode layers that are placed on both surfaces inside the peripheral edge portion and joined to the polyelectrolyte membrane so that the peripheral edge portion of the polyelectrolyte membrane is exposed, and the peripheral edge portion of the polyelectrolyte membrane exposed from the one pair of electrode layers is held between the first and second frame bodies.

According to a sixth aspect of the present invention, there is provided the electrode-membrane-frame assembly for a fuel cell as defined in the first aspect, further comprising:

a first separator sealing member for sealing between the first frame body and one of the separators, the first separator sealing member being placed on a separator-side surface of the first frame body; and a second separator sealing member for sealing between the second frame body and the other of the separators, the second separator sealing member being placed on a separator-side surface of the second frame body.

According to a seventh aspect of the present invention, there is provided the electrode-membrane-frame assembly for a fuel cell as defined in the first aspect, further comprising:

a membrane sealing member which is placed on each of membrane-side surfaces of the first frame body and the second frame body, each of the membrane-side surfaces facing the peripheral edge portion of the membrane electrode assembly, the membrane sealing member providing sealing between the membrane-side surfaces and the peripheral edge portion of the membrane electrode assembly.

According to an eighth aspect of the present invention, there is provided the electrode-membrane-frame assembly for a fuel cell as defined in the sixth aspect, further comprising:

a membrane sealing member which is placed on each of membrane-side surfaces of the first frame body and the second frame body, each of the membrane-side surfaces facing the peripheral edge portion of the membrane electrode assembly, the membrane sealing member providing sealing between the membrane-side surfaces and the peripheral edge portion of the membrane electrode assembly, wherein a through hole that penetrates the separator-side surfaces and the membrane-side surfaces is formed at the first and second frame bodies, and the separator sealing member located on the separator-side surface and the membrane sealing member located on the membrane-side surface are integrally connected together with a sealing member stuffed in the through hole.

According to a ninth aspect of the present invention, there is provided the electrode-membrane-frame assembly for a fuel cell as defined in the third aspect, wherein a projection is formed on either one of membrane-side surfaces of the first and second frame bodies, the membrane-side surfaces facing the peripheral edge portion side of the membrane electrode assembly, and an engagement hole to be engaged with the projection is formed on the other, the first and second frame bodies are fitted by mutual engagement of the projection and the engagement hole.

According to a tenth aspect of the present invention, there is provided the electrode-membrane-frame assembly for a fuel cell as defined in the ninth aspect, wherein a through hole is formed at the peripheral edge portion of the membrane electrode assembly, and the projection of the first or second frame body penetrates through the through hole.

According to an eleventh aspect of the present invention, there is provided the electrode-membrane-frame assembly for a fuel cell as defined in the first aspect, wherein the second frame body has a stepped portion whose bottom surface is a surface on which the peripheral edge portion of the membrane electrode assembly is placed, and the first frame body is placed on the stepped portion via the peripheral edge portion of the membrane electrode assembly.

According to a twelfth aspect of the present invention, there is provided the electrode-membrane-frame assembly for a fuel cell as defined in the eleventh aspect, further comprising:

an outer peripheral side sealing member for sealing between the one pairs of separators, the outer peripheral side sealing member being placed on both surfaces of the second frame body, each of the surfaces being located on an outer peripheral side of the stepped portion.

According to a 13th aspect of the present invention, there is provided the electrode-membrane-frame assembly for a fuel cell as defined in the first aspect, wherein the first and second frame bodies are formed of a resin material.

According to a 14th aspect of the present invention, there is provided a polyelectrolyte fuel cell having one or a plurality of layers of electric cell modules comprising:

the electrode-membrane-frame assembly as defined in the first aspect; and one pair of separators which are placed to hold the electrode-membrane-frame assembly therebetween.

According to a 15th aspect of the present invention, there is provided a manufacturing method of an electrode-membrane-frame assembly for a polyelectrolyte fuel cell constituting an electric cell module in the fuel cell by being placed held between one pair of separators, the method comprising:

preparing a membrane electrode assembly, a first frame body and a second frame body; and placing the first frame body on one surface at a peripheral edge portion of the membrane electrode assembly, placing the second frame body on the other surface at the peripheral edge portion of the membrane electrode assembly, and holding the peripheral edge portion of the membrane electrode assembly by the first and second frame bodies, thereby forming an electrode-membrane-frame assembly.

According to a 16th aspect of the present invention, there is provided the manufacturing method of an electrode-membrane-frame assembly for a fuel cell as defined in 15th aspect, wherein the peripheral edge portion of the membrane electrode assembly is held by the first and second frame bodies by releasably fitting at least part of either one of the first and second frame bodies to the other.

According to a 17th aspect of the present invention, there is provided the manufacturing method of an electrode-membrane-frame assembly for a fuel cell as defined in 16th aspect, further comprising:

after forming the electrode-membrane-frame assembly by holding the peripheral edge portion of the membrane electrode assembly by the first and second frame bodies, determining whether the electrode-membrane-frame assembly is defective; and releasing the fitting by the first and second frame bodies when the assembly is determined to be defective whereby separating the membrane electrode assembly in the electrode-membrane-frame assembly for its reusing.

According to a 18th aspect of the present invention, there is provided the manufacturing method of an electrode-membrane-frame assembly for a fuel cell as defined in 16th aspect, wherein the mutual fitting of the first and second frame bodies is performed by releasable engagement of a projection formed at either one of the first and second frame bodies with an engagement hole formed on the other.

According to a 19th aspect of the present invention, there is provided a polyelectrolyte fuel cell manufacturing method for manufacturing a fuel cell by forming an electric cell module in a manner that one pair of separators are placed to hold the electrode-membrane-frame assembly formed by the manufacturing method as defined in 15th aspect therebetween and stacking one or a plurality of electric cell modules.

According to the invention, in the structure for holding the peripheral edge portion of the membrane electrode assembly by the frame body, the holding structure with the frame body of the membrane electrode assembly, i.e., the electrode-membrane-frame assembly is achieved by separating the frame body into two pieces of the first and second frame bodies and placing the peripheral edge portion of the membrane electrode assembly held between the first frame body and the second frame body. Adopting the holding structure as described above allows the yield to be improved in comparison with, for example, a case where the electrode-membrane-frame assembly is formed by injection molding for injecting a thermoplastic resin into a metal mold in a state in which the membrane electrode assembly is placed in the metal mold for forming the frame body by resin molding. That is, in the case of forming by injection molding, it becomes difficult to separate the membrane electrode assembly from the frame body after molding. Therefore, for example, when defective molding of the frame body occurs due to injection failure of the resin material or the like, the membrane electrode assembly that is an expensive member compared with the resin material is disadvantageously wasted, and it is difficult to improve the yield. In contrast to this, in the holding structure such that the membrane electrode assembly is held between the first and second frame bodies, the holding structure of the membrane electrode assembly can be achieved separately from the manufacturing (e.g., resin molding) of the first and second frame bodies themselves. In addition, the holding by the holding of the first and second frame bodies allows the holding of the membrane electrode assembly to be easily released, and the membrane electrode assembly is not wasted. Therefore, according to the invention, a structure for improving the yield in manufacturing the electrode-membrane-frame assemblies for fuel cells and a manufacturing method therefor can be provided.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
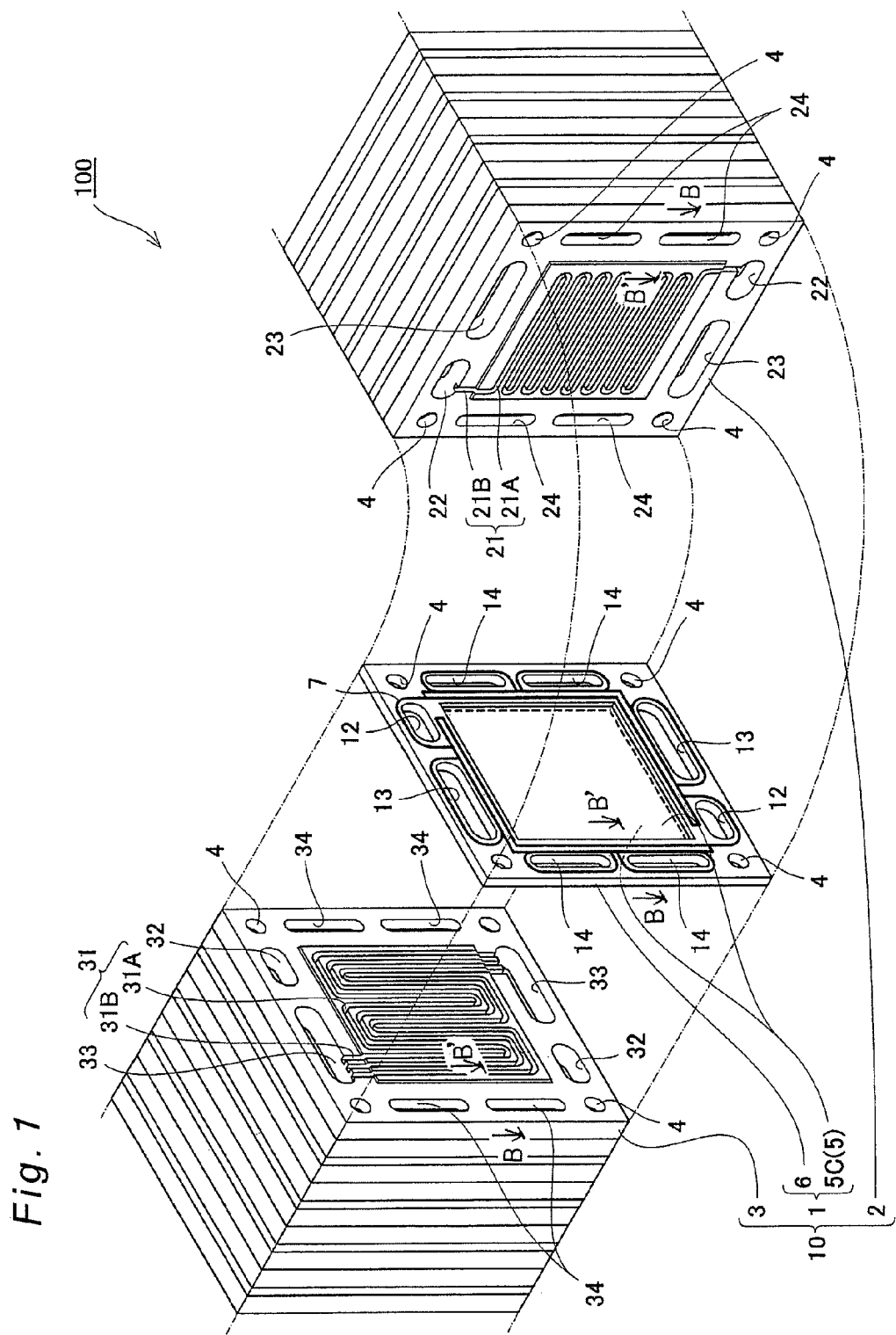
FIG. 1 is a partially exploded perspective view showing the schematic structure of a polyelectrolyte fuel cell according to a first embodiment of the invention.

Before the description of the present invention proceeds, it is to be noted that like parts are designated by like reference numerals throughout the accompanying drawings.

Hereinbelow, embodiments of the invention will be described in detail with reference to the drawings.

The First Embodiment

FIG. 1 is a partially exploded perspective view schematically showing the structure of a polyelectrolyte fuel cell (hereinafter referred to as "PEFC") according to the first embodiment of the present invention.

As shown in FIG. 1, a PEFC 100 is constituted by stacking a plurality of cells (electric cell modules) 10. It is noted that a collector plate, an insulating plate and an end plate (terminal plate) are attached to the outermost layer at both ends of the cells 10, and the cells 10 are constituted by being fastened with fastening bolts that penetrate bolt holes 4 from both ends and nuts (neither is shown). In the first embodiment, sixty pieces of cells 10 are layered, and the bolts that penetrate the bolt holes 4 and the nuts are fastened with a fastening force of 10 kN. Although the structure in which the plurality of cells 10 are layered is described as an example of the first embodiment, the invention can also be applied to a case where the PEFC is constructed of one cell.

The cells 10 are constituted by holding an electrode-membrane-frame assembly 1 between an anode separator 2 and a cathode separator 3 of one pair of conductive separators. More concretely, each cell 10 is constituted by holding both surfaces of a frame body 6 placed at the peripheral edge portion of the electrode-membrane-frame assembly 1 between one pair of separators 2 and 3 via a gasket 7 of one example of a sealing member placed on both surfaces. With this arrangement, a diffusion layer 5C provided on the outermost side of the electrode layer of a membrane electrode assembly (hereinafter referred to as "MEA") 5 is put in contact with the surfaces of the separators 2 and 3. A fuel gas passage and an oxidizer gas passage are defined by a diffusion layer contact portion 21A of a fuel gas passage groove 21 of the anode separator 2, a diffusion layer contact portion 31A of an oxidizer gas passage groove 31 of the cathode separator 3 and the diffusion layer 5C. With this arrangement, the fuel gas flowing through the diffusion layer contact portion 21A comes in contact with the diffusion layer 5C on the separator 2 side of the anode and causes an electrochemical reaction of the PEFC 100. Moreover, in the layered cells 10, mutually adjoining MEAs 5 are electrically connected in series or parallel.

Each one pair of through holes through which the fuel gas and the oxidizer gas flow, i.e., fuel gas manifold holes 12, 22 and 32 and oxidizer manifold holes 13, 23 and 33 are provided at the peripheral edge portions, i.e., the separators 2 and 3 and the frame body 6 of the electrodes-membrane-frame assembly 1. In the state in which the cells 10 are layered, these through holes are layered to form fuel gas manifolds and oxidizer manifolds.

Then, the fuel gas passage groove 21 is provided connecting between one pair of fuel gas manifold holes 22 and 22 on a principal surface inside the anode separator 2. The oxidizer gas passage groove 31 is provided connecting between one pair of oxidizer gas manifold holes 33 and 33 on a principal surface inside the cathode separator 3. That is, a construction such that the oxidizer gas and the fuel gas diverge from one manifold, i.e., the manifold on the feed side to the flow passage grooves 21 and 31, respectively, and flow to the other manifold, i.e., the manifold on the discharge side is provided. Then, in the assembled state of the cells 10, the fuel gas passage groove 21 is constituted of the diffusion layer contact portion 21A formed on the surface put in contact with the diffusion layer 5C and one pair of communication portions (flow passage grooves for communication) 21B formed between the surface put in contact with the diffusion layer 5C and a surface opposite to the periphery of the diffusion layer 5C. Likewise, in the assembled state of the cells 10, the flow passage groove 31 is constituted of the diffusion layer contact portion 31A formed on the surface put in contact with the diffusion layer 5C and one pair of communication portions (flow passage grooves for communication) 31B formed between the surface put in contact with the diffusion layer 5C and a surface opposite to the periphery of the diffusion layer 5C. In this case, the communication portions 21B and 31B are formed connecting one pair of manifold holes 22 and 33 with the diffusion layer contact portions 21A and 31A. With this arrangement, the oxidizer gas and the fuel gas flow from the fuel gas manifold hole 22 and the oxidizer gas manifold hole 33 located on the feed side divergently into the communication portions 21B and 31B, respectively, and come in contact with the diffusion layer 5C at the diffusion layer contact portions 21A and 31A, respectively, causing electrochemical reactions. Then, surplus gas and reaction product components of them are discharged to the fuel gas manifold hole 22 and the oxidizer gas manifold hole 33 located on the discharge side via the communication portions 21B and 31B connected to the fuel gas manifold hole 22 and the oxidizer gas manifold hole 33 located on the discharge side.

The gasket 7 is provided on the principal surfaces located on both surfaces of the frame body 6 of the membrane electrode assembly 1. The gasket 7 is provided so that the oxidizer gas and the fuel gas do not flow out of the prescribed flow passages grooves 21 and 31. That is, the gasket 7 is placed surrounding the peripheries of the manifold holes 12, 13 and 14 and the periphery of the frame. Moreover, in this case, the gasket 7 is not provided in the position where it is put in contact with the communication portion 21B of the fuel gas passage groove 21 on the anode separator 2 side in the assembled state of the cells 10. The gasket 7 is also provided to integrally surround the fuel gas manifold hole 12 and the MEA 5. Likewise, the gasket 7 is not provided in the position where it is put in contact with the communication portion 31B of the fuel gas passage groove 31 on the cathode separator 3 side in the assembled state of the cells 10. Moreover, the fuel gas and the oxidizer gas are prevented from leaking to the outside of the fuel gas passage groove 21 and the oxidizer gas passage groove 31 by the gasket 7 so that the flow of the fuel gas flowing between the oxidizer gas manifold hole 13 and the MEA 5 and the oxidizer gas flowing between the oxidizer gas manifold hole 33 and the MEA 5 is not obstructed. It is noted that the meander structures of the flow passage grooves 21 and 31 of the diffusion layer contact portions 21A and 31A of the gasket 7 and the separators 2 and 3 are schematically illustrated in FIG. 1 for the sake of convenience in explanation.

Although the PEFC 100 of the first embodiment is described on a case where the manifolds are constructed of through holes of the separators, there may be the construction of so-called external manifolds, i.e., manifolds formed outside the separators in place of the above case. That is, instead of forming the fuel gas manifold holes 12, 22 and 32 and the oxidizer gas manifold holes 13, 23 and 33 at the electrode-membrane-frame assembly 1 and the separators 2 and 3, the communication portions 21B and 31B of the fuel gas passage groove 21 and the oxidizer gas passage 31 are extended to the end surfaces of the separators 2 and 3, respectively. Then, piping for feeding the fuel gas and the oxidizer gas is divergently joined to the end surfaces of the separators 2 and 3. In the case of the external manifolds, the gasket 7 is provided extended to the end surfaces of the frame body 6 along the peripheries of the communication portions 21B and 31B of the fuel gas passage groove 21 and the oxidizer gas passage groove 31, respectively. The manifolds should preferably be formed of the through holes of the separators from the viewpoint of compacting the PEFC 100 and simplicity in the construction of the external appearance.

Moreover, water manifold holes 14, 24 and 34 that form two pairs of manifolds through which water flows are provided at the peripheral edge portions of the separators 2 and 3 and the electrodes-membrane-frame assembly 1 similar to the fuel gas manifold holes 12, 22 and 32 and the oxidizer gas manifold holes 13, 23 and 33. With this arrangement, these manifold holes are layered to form two pairs of water manifolds in the layered state of the cells 10.

Figure 2:
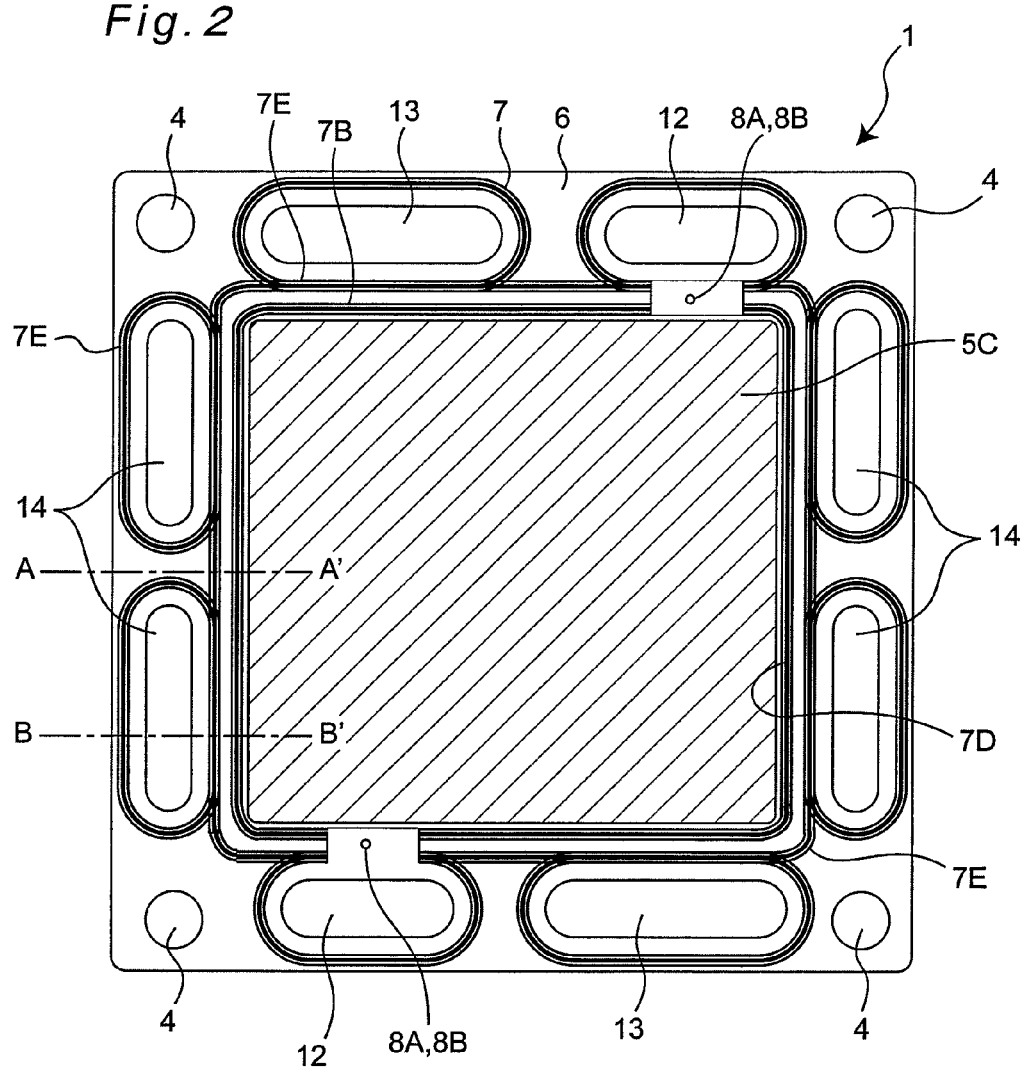
FIG. 2 is a top view of an electrode-membrane-frame assembly in a cell that constitutes the fuel cell of FIG. 1, viewed from an anode-side surface.

A schematic plan view of the electrode-membrane-frame assembly 1 is shown in FIG. 2. A sectional view taken along the line A-A' and a sectional view taken along the line B-B' of the electrode-membrane-frame assembly 1 of FIG. 2 are shown in FIGS. 5 and 6, respectively.

Figure 5:
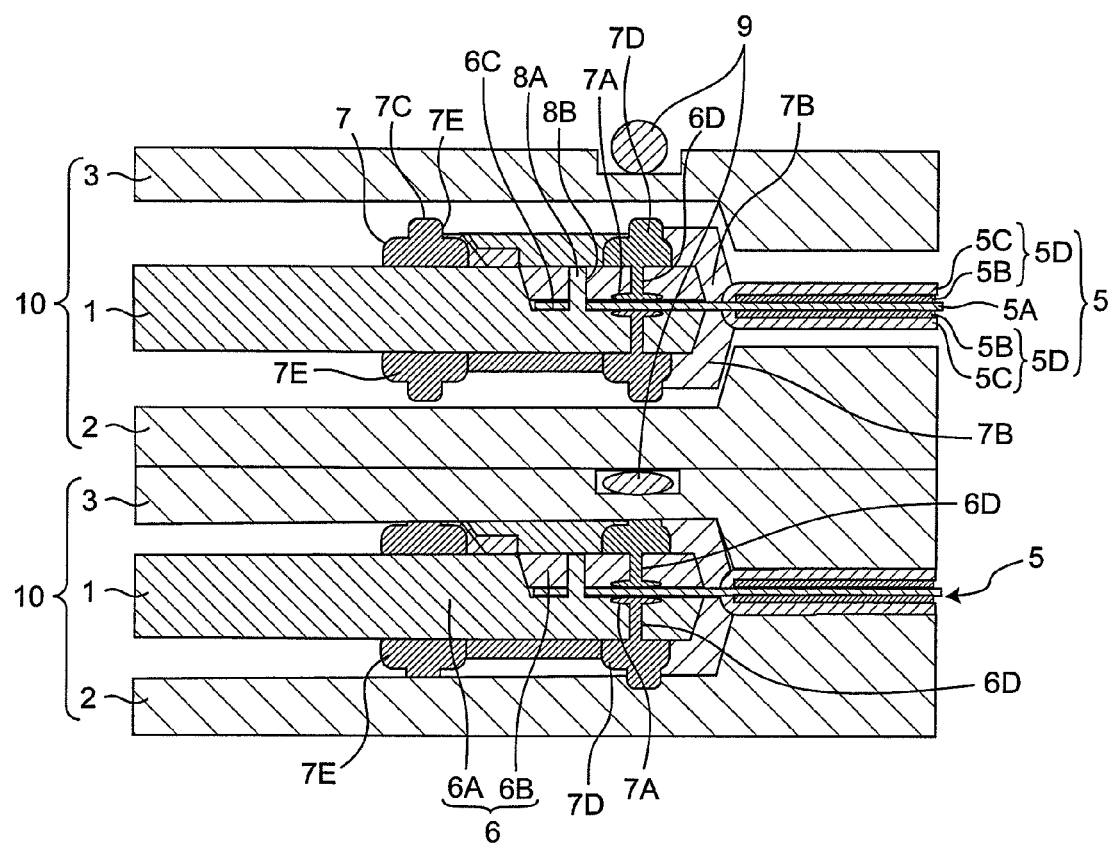
FIG. 5 is a partially exploded sectional view taken along the laminate section A-A' of the cell of FIG. 2.
Figure 6:
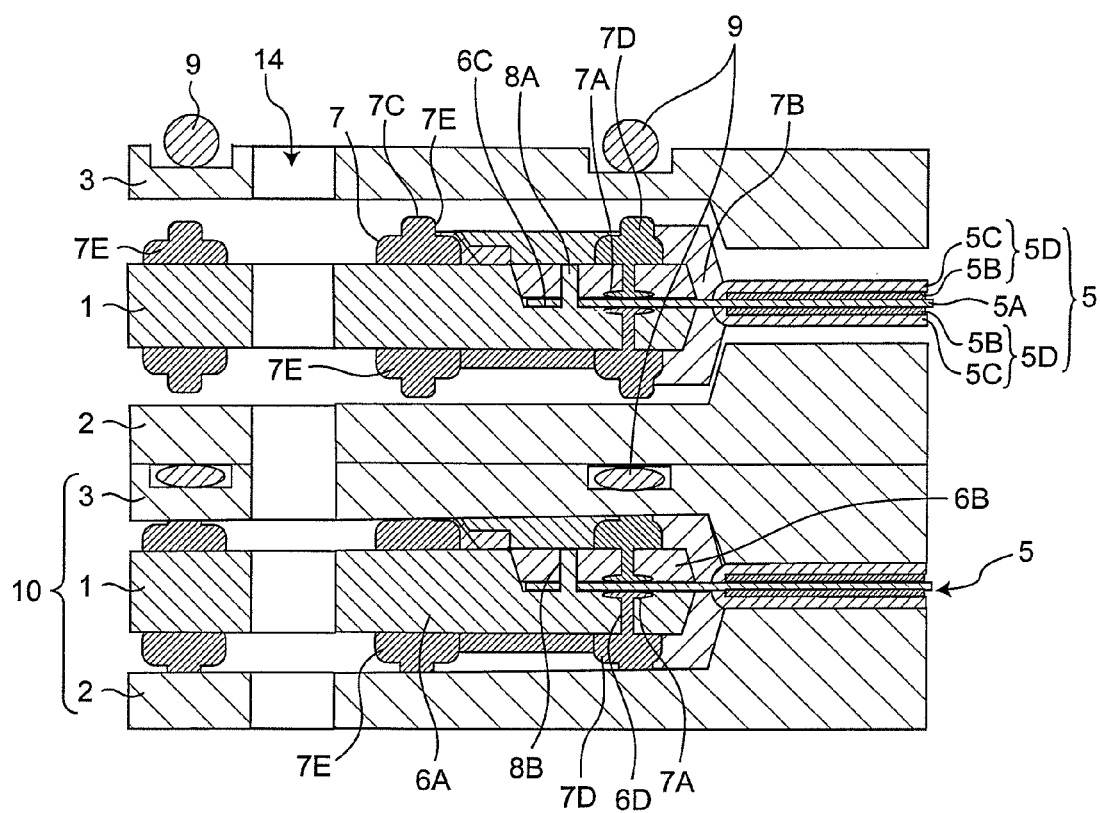
FIG. 6 is a partially exploded sectional view taken along the laminate section B-B' of the cell of FIG. 2.

As shown in FIGS. 5 and 6, the MEA 5 has a polyelectrolyte membrane 5A that selectively transfers hydrogen ions and one pair of electrode layers 5D (electrode layer of an anode and a cathode) formed on both surfaces of the polyelectrolyte membrane 5A. The electrode layers 5D each normally have a catalyst layer 5B that is made of a principal ingredient of carbon powder carrying a platinum catalyst and formed on the surface of the polyelectrolyte membrane 5A, and a diffusion layer 5C that is formed on the outer surface of the catalyst layer 5B and concurrently has air permeability and the electrical conductivity. It is noted that the catalyst layer 5B may have a two-layer structure of a water repellent carbon layer and a platinum carbon layer (not shown).

The anode separator 2 and the cathode separator 3 have flat plate-like shapes. The surface put in contact with the electrode-membrane-frame assembly 1, i.e., the inner surface has a stepped portion such that a center portion projects in a trapezoidal shape in correspondence with the shape of the electrode-membrane-frame assembly 1, or more concretely a step due to a difference in thickness between the frame body 6 and the MEA 5. In this case, the anode separator 2 and the cathode separator 3 are provided by, for example, glassy carbon (3 mm in thickness) produced by Tokai Carbon Co., Ltd. At the separators 2 and 3, various manifold holes 22, 23, 32, 33 and 34 and bolt holes 4 penetrate the thickness directions of the separators 2 and 3. Moreover, a fuel gas passage groove 21 and an oxidizer gas passage groove 31 are formed on the inner surfaces of the separators 2 and 3, and a water passage groove (not shown) is formed on each of the back surfaces of the separators 2 and 3. The various manifold holes 22, 23, 24, 32, 33 and 34 and the bolt holes 4, the oxidizer gas passage groove 31, the water passage groove 50 and so on are formed by a cutting process or a shape forming process.

In this case, the water passage groove is formed connecting between two pairs of water manifold holes 24 and 34. That is, water diverges from one manifold, i.e., the manifold on the feed side divergently to the water passage groove and flows to the other manifold, i.e., the manifold on the drainage side. This allows the cells 10 to be maintained at a prescribed temperature appropriate for electrochemical reactions by virtue of the heat conducting ability of water. It is noted that supplying and draining passages for cooling may have external manifold structures similar to those of the fuel gas and the oxidizer gas instead of forming the water manifold holes 14, 24 and 34 at the peripheral edge portions of the separators 2 and 3 and the membrane electrode assembly 1. Further, the cells 10 may be layered by inserting a cooling unit through which cooling water circulates between mutually adjoining cells without forming water passage grooves on the back surfaces of the separators 2 and 3.

As shown in FIGS. 5 and 6, the frame body 6 is constituted by combining a first frame body 6A with a second frame body 6B. In concrete, a construction such that the peripheral edge portion of the polyelectrolyte membrane 5A is arranged so as to be exposed at the peripheral edge portion of the MEA 5 between the first frame body 6A and the second frame body 6B, and the MEA 5 is held between both the frame bodies 6A and 6B of the frame body 6. Further, a rib (rib for positioning) 8A as one example of the projection for mechanically fitting the second frame body 6B is formed at the first frame body 6A. By fitting the rib into a hole (engagement hole for positioning) 8B of the second frame body 6B, the first and second frame bodies 6A and 6B are mechanically integrated together.

Figure 3:
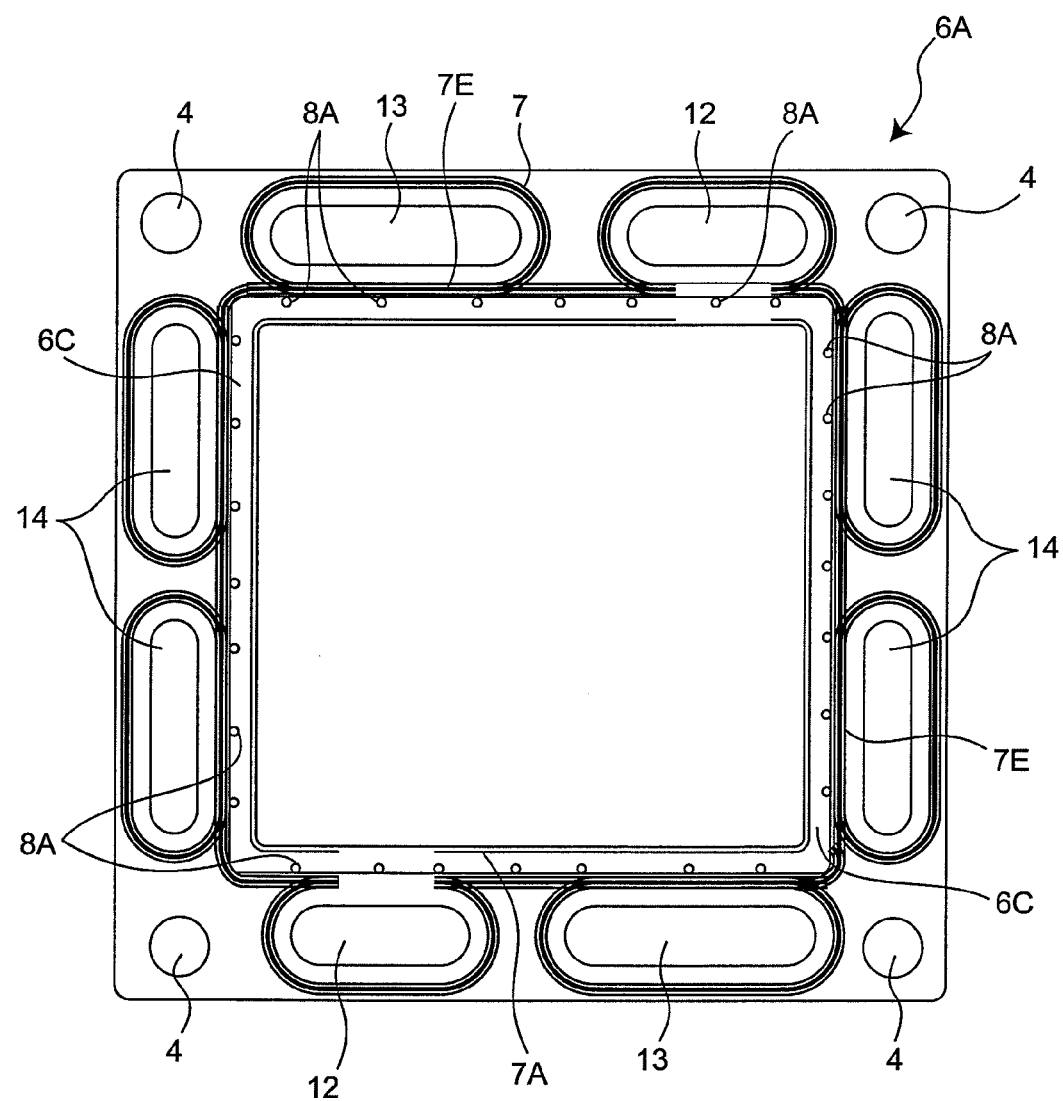
FIG. 3 is a top view of a first frame body that constitutes the electrode-membrane-frame assembly of FIG. 2.
Figure 4:
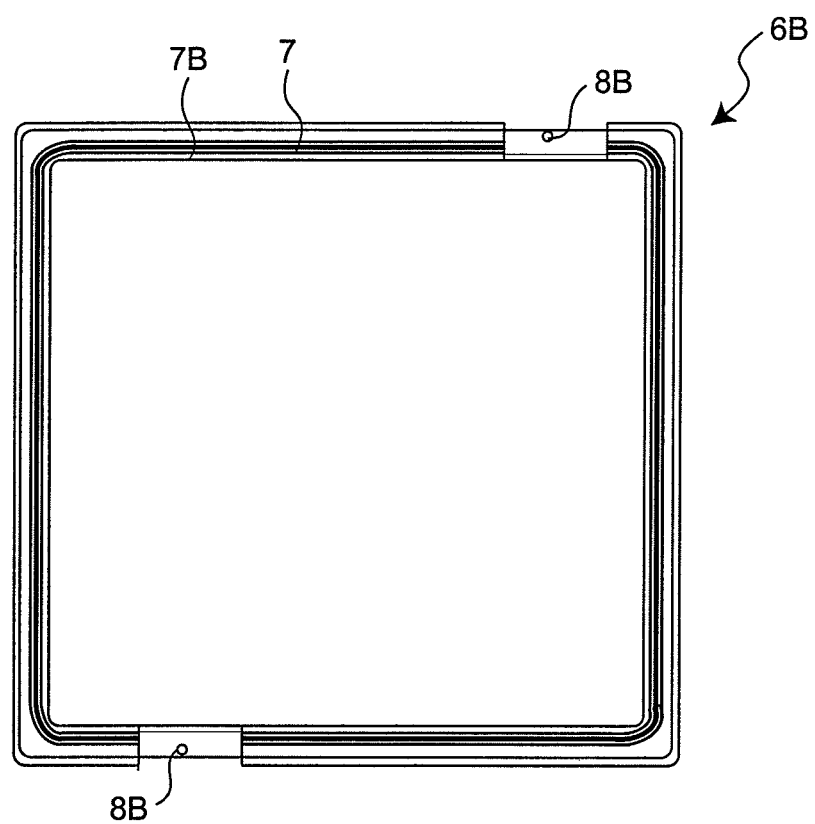
FIG. 4 is a top view of a second frame body that constitutes the electrode-membrane-frame assembly of FIG. 2.

A schematic plan view of the first frame body 6A is shown in FIG. 3, and a schematic plan view of the second frame body 6B is shown in FIG. 4. As shown in FIGS. 3, 4, 5 and 6, at the first frame body 6A, a stepped portion 6C is formed at an inner edge portion on a surface (polyelectrolyte-membrane-side surface) opposite to the surface (separator-side surface) on the anode separator 2 side. Moreover, at the second frame body 6B, a surface (polyelectrolyte-membrane-side surface) opposite to the surface (separator-side surface) on the cathode separator 3 side is formed so as to fit to the shape of the stepped portion 6C. The peripheral edge portion of the polyelectrolyte membrane 5A exposed at the peripheral edge portion of the MEA 5 is placed on the stepped portion 6C of the first frame body 6A, and the second frame body 6B is fitted to the stepped portion 6C so as to hold the polyelectrolyte membrane 5A therebetween. It is noted that the rib 8A of the first frame body 6A is formed on the stepped portion 6C.

Moreover, the gasket 7 as one example of the sealing member is formed at the first and second frame bodies 6A and 6B. The gasket 7 is constructed of an elastic body and deformed by being pressurized by the electrode-membrane-frame assembly 1 placed between one pair of separators 2 and 3. As shown in FIGS. 2 through 4, the periphery (i.e., located between the MEA 5 and the separators 2 and 3) of the MEA 5 and the peripheries of the manifold holes are sealed. Moreover, at the peripheries of the fuel gas manifold hole 12 and the oxidizer manifold hole 13, the peripheries of the manifold holes are also similarly sealed by the gasket 7.

In concrete, the gasket 7 is placed extending along the frame shape of the frame body 6 and has an inner gasket 7D in a frame-like shape placed inside and an outer gasket 7E in a frame-like shape placed outside, adopting a double seal structure. The inner gasket 7D is formed on the separator-side surface, located opposite to the stepped portion 6C, of the first frame body 6A and on the separator-side surface of the second frame body 6B. Further, the outside gasket 7E is formed separated apart from the inner gasket 7D in the outer peripheral direction and formed on both surfaces of the first frame body 6A outside the stepped portion 6C of the first frame body 6A. As shown in FIGS. 2 through 4 and 6, sealing of the manifold holes is achieved by the outside gasket 7E.

As shown in FIGS. 5 and 6, a rib (protuberance) 7C is formed extending in the direction in which the gasket 7 extends at the top surface of the gasket 7 (inner gasket 7D and outer gasket 7E). Since pressurizing forces are concentrated on the rib 7C in the assembled state of the cells 10, the rib 7C can more appropriately seal the peripheries of the manifold holes 12, 13 and 14 and the MEA 5. Moreover, a space (MEA peripheral gap) is formed in a portion surrounded by the peripheral edge portion of the MEA 5, the inner edge portion of the frame body 6 and one pair of separators 2 and 3. If such a gap exists along the peripheral edge portion of the MEA 5, the gas creeps along the gap, and it is concerned that the use efficiency of the gas to be used for power generation is lowered. Therefore, a plurality of rib-shaped gas creeping preventing parts 7B are formed extending from the inner gasket 7D as part of the gasket 7 toward the inside of the MEA 5 at the inner edge portions of the first frame body 6A and the second frame body 6B so that no communication is made through the gap along the peripheral edge portions. By virtue of the gas creeping preventing parts 7B formed as described above, the communication through the gap is interrupted in the placement location, and the gas creeping is prevented.

Moreover, as shown in FIGS. 5 and 6, a plurality of through holes 6D are formed along the direction in which the inner gasket 7D extends in a portion where the inner gasket 7D is formed at the first and second frame bodies 6A and 6B. Moreover, a membrane gasket 7A as one example of the membrane sealing member is formed on the membrane-side surfaces of the first and second frame bodies 6A and 6B, i.e., the surfaces put in contact with the polyelectrolyte membrane 5A. The membrane gasket 7A is formed of an elastic body as part of the gasket 7 and integrally connected with the inner gasket 7D via the elastic body stuffed through the respective through holes 6D. Providing the membrane gasket 7A enables reliable sealing of a space between the polyelectrolyte membrane 5A and the first and second frame bodies 6A and 6B and prevention of cross-leaking of gas through the space. It is noted that the membrane gasket 7A is referred to as a gas cross-leaking preventing part 7A in view of the function of the membrane gasket 7A. Further, the through holes 6D are formed as through holes perpendicular to the frame bodies 6A and 6B so as to provide communication between the inner gasket 7D and the gas cross-leaking preventing part 7A and internally stuffed with elastic bodies. With the structure adopted as described above, the electrode-membrane-frame assembly 1 is held between the separators 2 and 3. Consequently, the separators 2 and 3 pressurize the inner gasket 7D, and the pressurizing forces are transmitted to the gas cross-leaking preventing part 7A via the elastic bodies in the through holes 6D. As a result, the pressurizing forces of the gas cross-leaking preventing part 7A against the polyelectrolyte membrane 5A can be further increased and the sealing effect can be further improved when the electrode-membrane-frame assembly 1 is held between the separators 2 and 3 than in a state in which the MEA 5A is merely held between the first and second frame bodies 6A and 6B (i.e., in a state in which the MEA 5 is not held between the separators 2 and 3).

The frame body 6 (first frame body 6A and second frame body 6B) is formed of a thermoplastic resin. The thermoplastic resin is chemically clean and stable at and below the operating temperature of the PEFC 100 and has a moderate elasticity modulus and a comparatively high load deflection temperature. For example, when the fuel gas passage 21 and the oxidizer gas passage 31 of the separators 2 and 3 have a width of about 1 to 2 mm and the frame body 6 has a thickness of not greater than approximately 1 mm, the compressive elasticity modulus of the frame body 6 should preferably be at least 2000 MPa or more. In this case, the elasticity modulus means the compressive elasticity modulus measured by the compressive elasticity modulus measuring method provided by JIS-K7181.

Moreover, since the operating temperature of the PEFC 100 is generally not higher than 90° C., the load deflection temperature of the frame body 6 should preferably be not lower than 120° C. Moreover, from the viewpoint of chemical stability, the frame body 6 should preferably be made of a crystalline resin instead of a non-crystalline resin, and a material having a great mechanical strength and high thermal resistance is preferable among others. For example, the so-called super-engineering plastic grade materials are suitable, and polyphenylene sulfide (PPS), polyether ether ketone (PEEK), crystal polymer (LCP) polyether nitrile (PEN) and so on can be enumerated. These are suitable materials that have a compressive elasticity modulus of several thousands to several tens of thousands of megapascals and a load deflection temperature of not lower than 150° C. Moreover, even in the case of a general-purpose resin material, for example, polypropylene filled with glass filler (GFPP) or the like has an elasticity modulus several times that of non-filled polypropylene (compressive elasticity rate: 1000 to 1500 MPa) and a load deflection temperature close to 150° C. and is able to be suitably used. In the first embodiment, glass filler incorporated PPS (DIC-PPS FZ1140-B2 by DIC Corporation) that is a thermoplastic resin is used.

Moreover, the gasket 7 is constructed of a thermoplastic resin or a thermoplastic elastomer as an elastic body. The thermoplastic resin or thermoplastic elastomer is chemically stable under the operating condition of the PEFC 100 and has hot water resistance such that particularly hydrolysis is not caused. For example, the compressive elasticity modulus of the gasket 7 should preferably be not greater than 200 MPa. A suitable material is selected from the group consisting of: polyethylene, polypropylene, polybutylene, polystyrene, polyvinyl chloride, polyvinylidene chloride, polyvinyl alcohol, polyacrylamide, polyamide, polycarbonate, polyacetal, polyurethane, silicone, fluororesin, polybutylene terephthalate, polyethylene terephthalate, syndiotactic polystyrene, polyphenylene sulfide, polyether ether ketone, polysulfone, polyether sulfone, polyarylate, polyamide-imide, polyetherimide, thermoplastic polyimide and so on. With this arrangement, a satisfactory sealing performance can be secured in the fastening load of the PEFC 100. In the first embodiment, Santoprene 8101-55 (produced by Advanced Elastomer Systems Inc.) that is a polyolefin based thermoplastic elastomer is used.

A general sealing member 9 such as squeezed packing made of a heat-proof material is provided at the peripheries of various manifold holes on the back surfaces of the anode separator 2 and the cathode separator 3. With this arrangement, the outflow of the fuel gas, the oxidizer gas and water from the joined portions of various manifold holes 22, 23, 24, 32, 33 and 34 between cells 10 is prevented between mutually adjoining cells 10.

Figure 13:
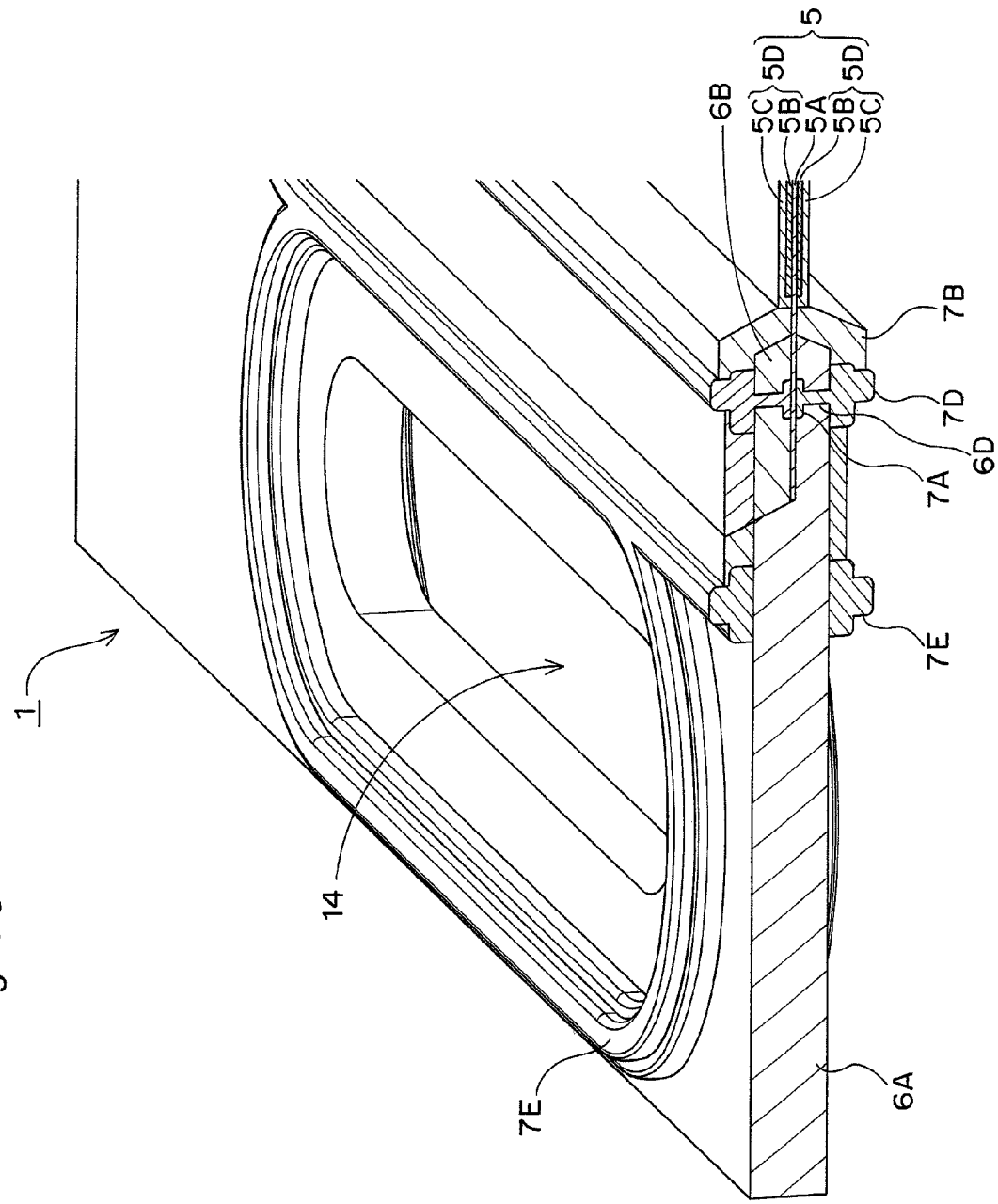
FIG. 13 is a schematic partial perspective view of the electrode-membrane-frame assembly of the first embodiment.
Figure 14:
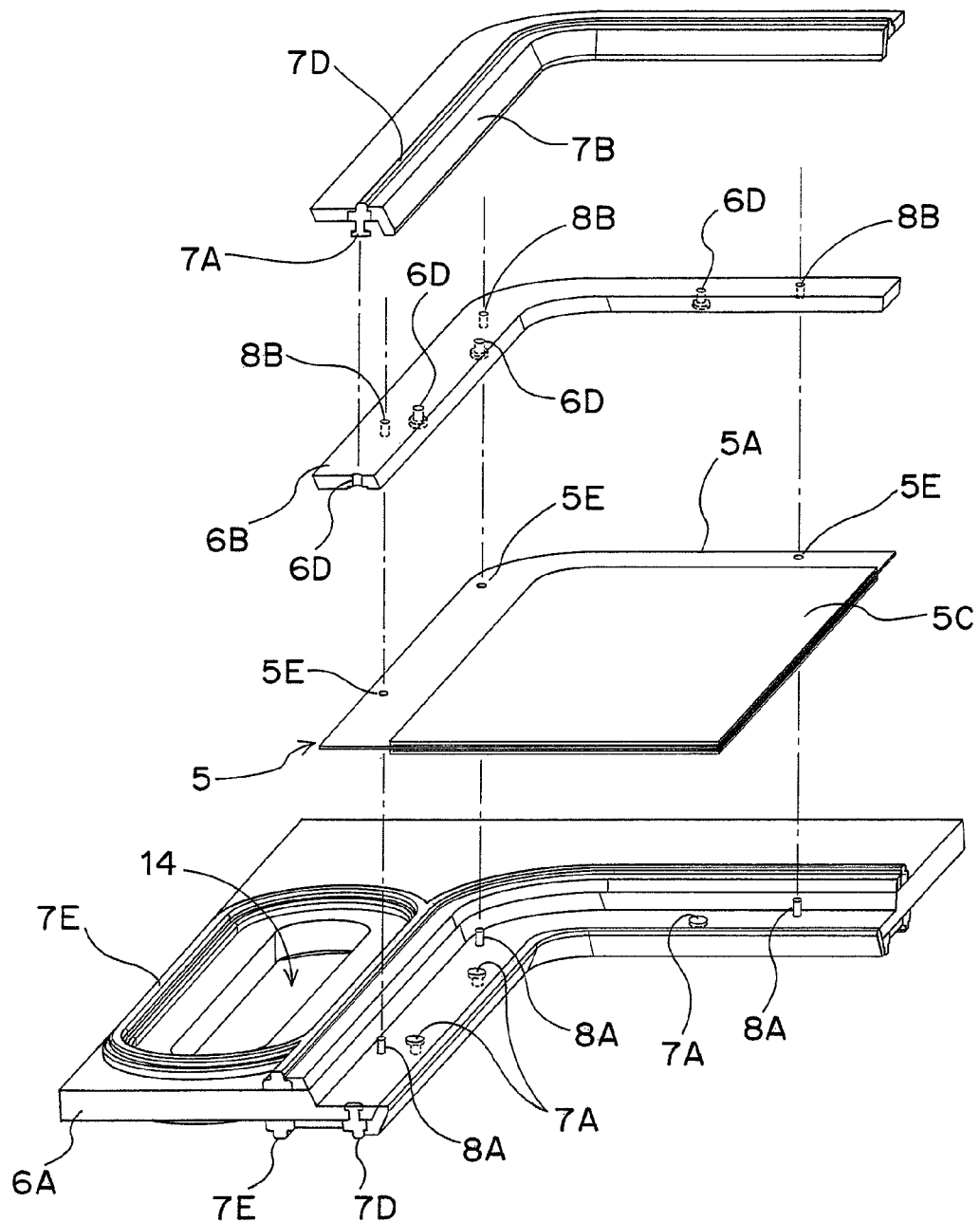
FIG. 14 is a schematic exploded view of the electrode-membrane-frame assembly of the first embodiment.

A schematic partial perspective view (partially sectional) of the structure of the electrode-membrane-frame assembly 1 of the first embodiment described with reference to the schematic plan views and sectional views of FIGS. 2, 3, 4, 5 and 6 is three-dimensionally shown in FIG. 13. Further, a schematic exploded view showing a state in which the first frame body 6A, the second frame body 6B and the MEA 5 in the electrode-membrane-frame assembly 1 are disassembled, and further the sealing member parts 7A, 7B, 7C and 7D such as gaskets in the second frame body 6B are disassembled from the second frame body 6B is shown in FIG. 14. Referring to FIGS. 13 and 14, the structure of the electrode-membrane-frame assembly 1 described hereinabove can easily be understood.

A method for manufacturing the electrode-membrane-frame assembly 1 is described next. FIGS. 7A, 7B, 7C, 7D and 7E are manufacturing process charts schematically showing manufacturing processes of the electrode-membrane-frame assembly 1 of the first embodiment.

Figure 7A:
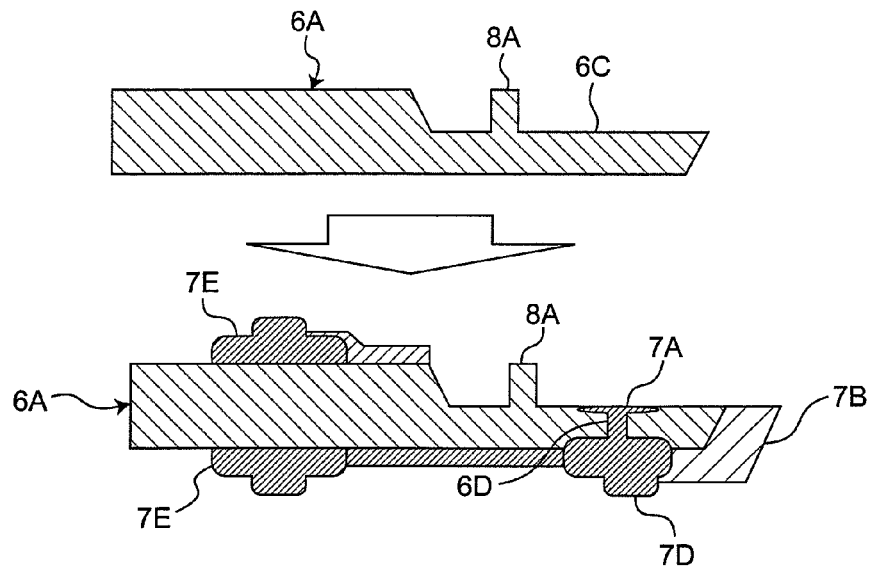
FIG. 7A is a manufacturing process chart of the electrode-membrane-frame assembly of the first embodiment, showing a process for manufacturing a first frame body.
Figure 7B:
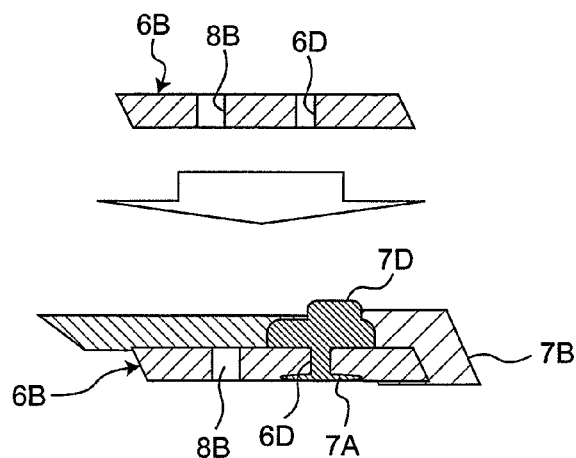
FIG. 7B is a manufacturing process chart of the electrode-membrane-frame assembly of the first embodiment, showing a process for manufacturing a second frame body.
Figure 7C:
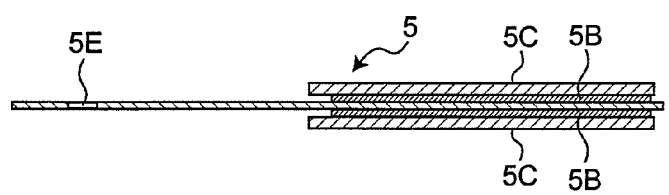
FIG. 7C is a manufacturing process chart of the electrode-membrane-frame assembly of the first embodiment, showing a process for manufacturing an MEA.

First, as shown in FIG. 7C, catalyst layers 5B are formed on both surfaces at a center portion of the polyelectrolyte membrane 5A, i.e., on both surfaces located inside in a manner that the peripheral edge portion is exposed. Next, diffusion layers 5C are formed so as to cover the entire surfaces of the thus-formed catalyst layers 5B. At this time, the diffusion layers 5C are formed so as to cover the entire surfaces including the peripheral edges of the catalyst layers 5B and to project slightly outwardly of the peripheral edges of the catalyst layers 5B.

In concrete, the catalyst layers 5B are formed, for example, as follows. Platinum is carried by a weight ratio of 1:1 on KETJENBLACK EC (furnace black produced by KETJENBLACK INTERNATIONAL CORPORATION, specific surface area: 800 $m^2$/g, DPB oil absorption amount: 360 ml/100 g). Next, a catalyst layer ink is produced by mixing 35 g of water and 59 g of an alcohol dispersion of a hydrogen ion conductive polyelectrolyte (produced by ASAHI GLASS CO., LTD. 9% FSS) in 10 g of the catalyst powder and dispersing the mixture by an ultrasonic agitator. Then, by spray-coating the catalyst layer ink to a thickness of 20 μm on both principal surfaces of the polyelectrolyte membrane 5A and thereafter heat-treating the same for 20 minutes at 115° C., the catalyst layers 5B are formed. It is noted that the spray coating is carried out by placing a mask that has an opening of 120 mm×120 mm on the polyelectrolyte membrane 5A. In this case, a perfluorocarbon sulfonic acid membrane (DUPONT Nafion117 (registered trademark)) having an outside diameter of 140 mm square and a thickness of 50 μm is used for the polyelectrolyte membrane 5A. A hole (through hole) 5E for fitting to the rib 8A provided at the stepped portion 6C of the first frame body 6A is formed at the peripheral edge portion of the polyelectrolyte membrane 5A. The hole 5E functions as a hole 5E for positioning in placing the MEA 5 on the stepped portion 6C of the first frame body 6A and concurrently has a function to temporarily hold the MEA 5 positioned on the first frame body 6A.

Next, the diffusion layers 5C are formed on the catalyst layers 5B. The diffusion layers 5C are constructed of a porous body that have numbers of minute pores. With this arrangement, the fuel gas or the oxidizer gas enters the porous portions, and the gas diffuses and easily reaches the catalyst layers 5B. In the first embodiment, for example, a 123-mm carbon fiber cloth (Carbel CL400 produced by JAPAN GORE-TEX INC., having a thickness of 400 µm) is placed on both principal surfaces of the polyelectrolyte membrane 5A on which the catalyst layers 5B are provided. Then, by hot-pressing the carbon fiber cloth on the conditions of a pressure of 0.5 MPa, 135° C. and 5 minutes, the diffusion layers 5C are formed bonded onto the catalyst layers 5B on both principal surfaces of the polyelectrolyte membrane 5A.

As shown in FIG. 7A, the first frame body 6A is formed of a thermoplastic resin material by injection molding. Subsequently, the inner gasket 7D, the outer gasket 7E, the gas creeping preventing part 7B and the gas cross-leaking preventing part 7A are formed at the first frame body 6A.

As shown in FIG. 7B, the second frame body 6B is also formed of a thermoplastic resin material by injection molding. Subsequently, the inner gasket 7D, the gas creeping preventing part 7B and the gas cross-leaking preventing part 7A are formed at the second frame body 6B.

Figure 7D:
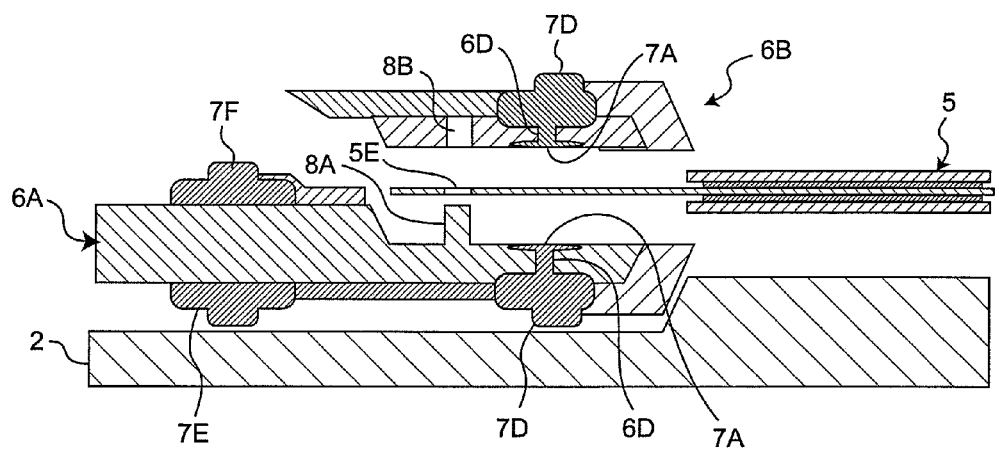
FIG. 7D is a manufacturing process chart of the electrode-membrane-frame assembly of the first embodiment, showing a process for combining the first frame body, the second frame body and MEA together.
Figure 7E:
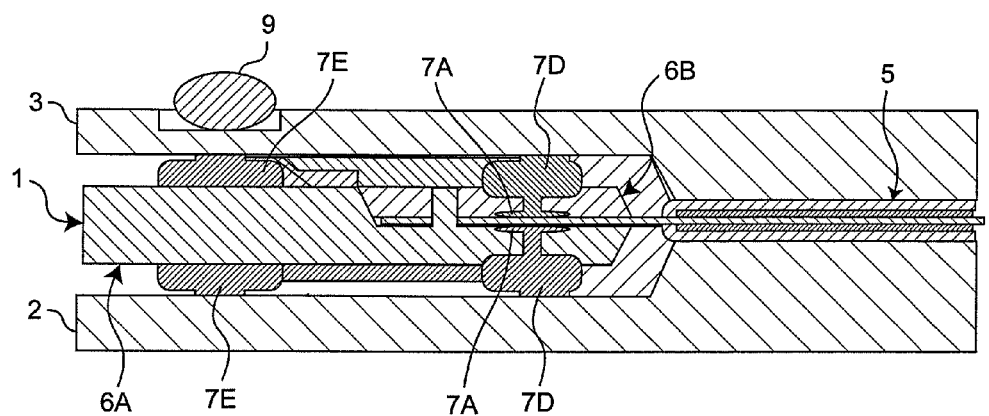
FIG. 7E is a manufacturing process chart of the electrode-membrane-frame assembly of the first embodiment, showing a state in which the cell is completed.

The thus-formed MEA 5, first frame body 6A and second frame body 6B are prepared. Subsequently, as shown in FIG. 7D, while positioning the MEA 5 by fitting the holes 5E formed at the peripheral edge portions of the MEA 5 to the respective ribs 8A formed on the stepped portion 6C of the first frame body 6A, the peripheral edge portion of the MEA 5 is placed on the stepped portion 6C of the first frame body 6A. Subsequently, by engaging the holes 8B of the second frame body 6B with the ribs 8A of the first frame body 6A, the second frame body 6B is fitted to the first frame body 6A. The peripheral edge portions of the MEA 5 are held between the first and second frame bodies 6A and 6B, so that the electrode-membrane-frame assembly 1 is assembled. Subsequently, the cell 10 is completed by holding the assembled electrode-membrane-frame assembly 1 between the separators 2 and 3.

As described above, according to the manufacturing method of the electrode-membrane-frame assembly 1 of the first embodiment, the first and second frame bodies 6A and 6B can be formed by metal molds regardless of the MEA 5. That is, since the MEA 5 needs not be placed in the metal mold for forming the frame body 6, the MEA 5 can be prevented from being thermally damaged. Furthermore, even in such a case that defective molding occurs in molding the frame bodies, the MEA 5 is not wasted. Moreover, even in such a case that defective gasket 7 or frame bodies 6A and 6B are found in the electrode-membrane-frame assembly 1, the MEA 5 can be removed by disassembling the frame bodies 6A and 6B, and therefore, the MEA 5 is not wasted. Therefore, electrode-membrane-frame assemblies having the advantages of reliable sealing performance, manifold forming and so on can be manufactured with high yield.

The Second Embodiment

Figure 8:
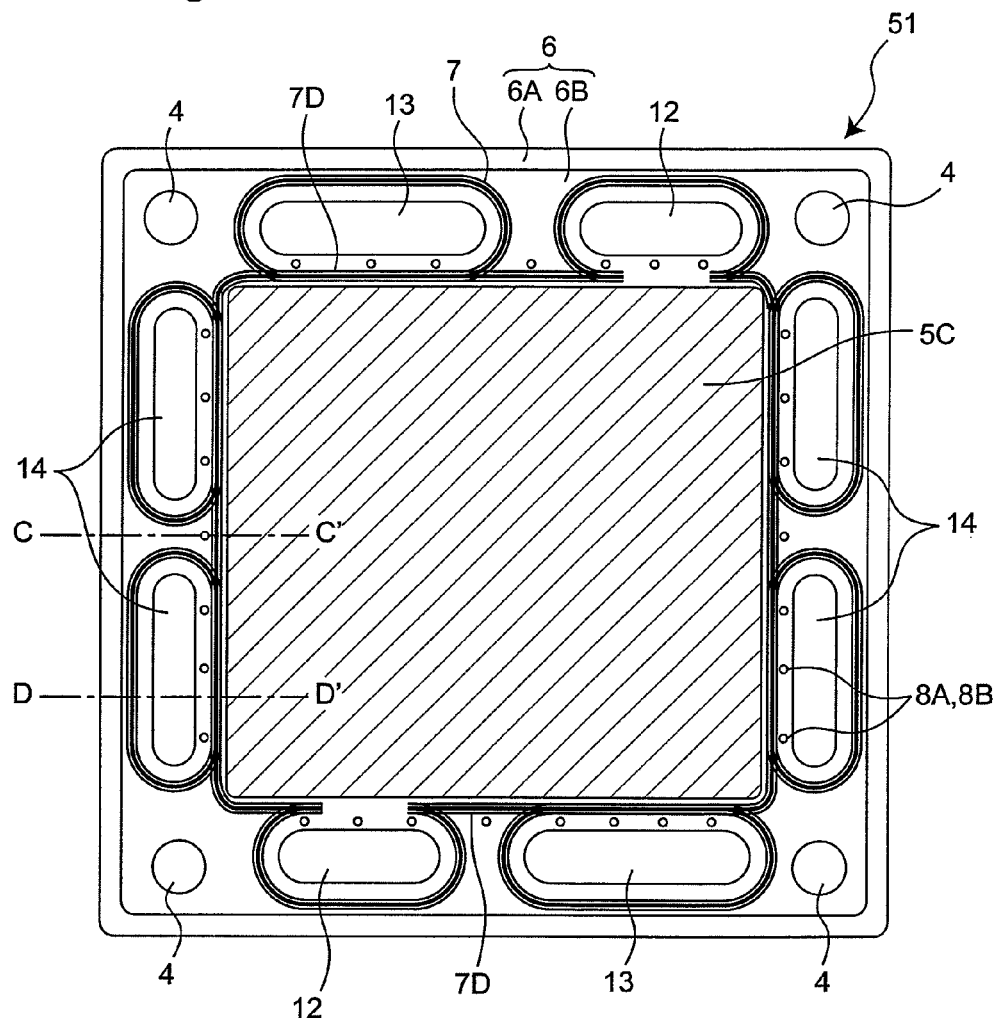
FIG. 8 is a top view of an electrode-membrane-frame assembly in a cell that constitutes a fuel cell according to a second embodiment of the invention, viewed from an anode-side surface.
Figure 9:
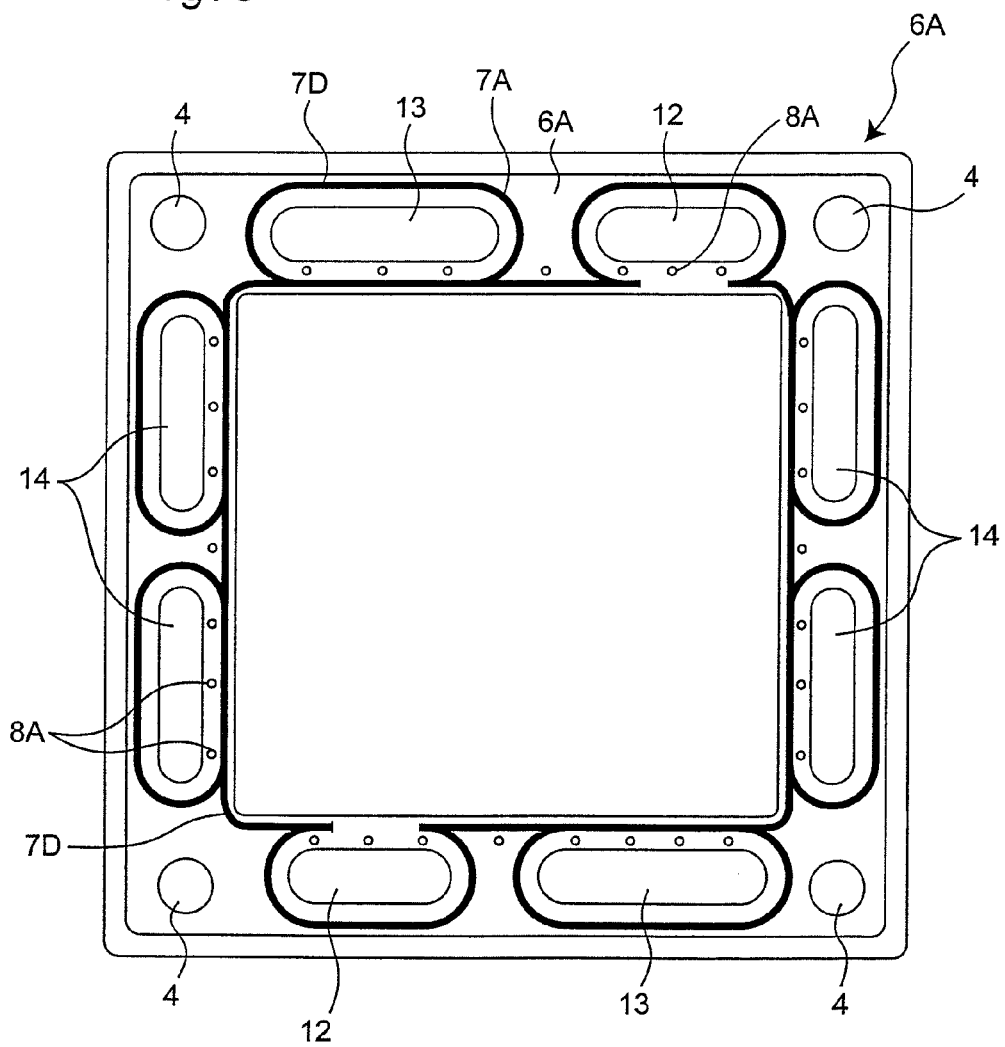
FIG. 9 is top view of a first frame body that constitutes the electrode-membrane-frame assembly of FIG. 8.
Figure 10:
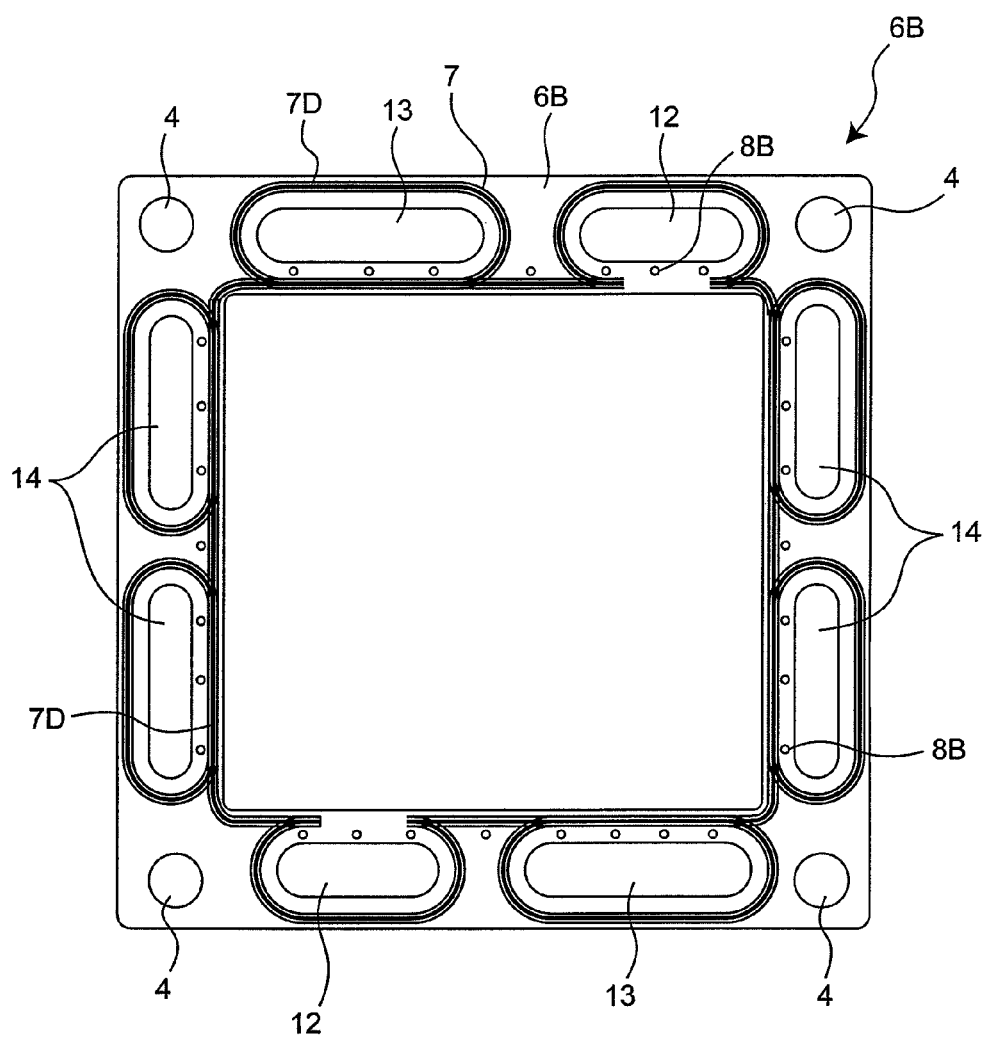
FIG. 10 is a top view of a second frame body that constitutes the electrode-membrane-frame assembly of FIG. 8.
Figure 11:
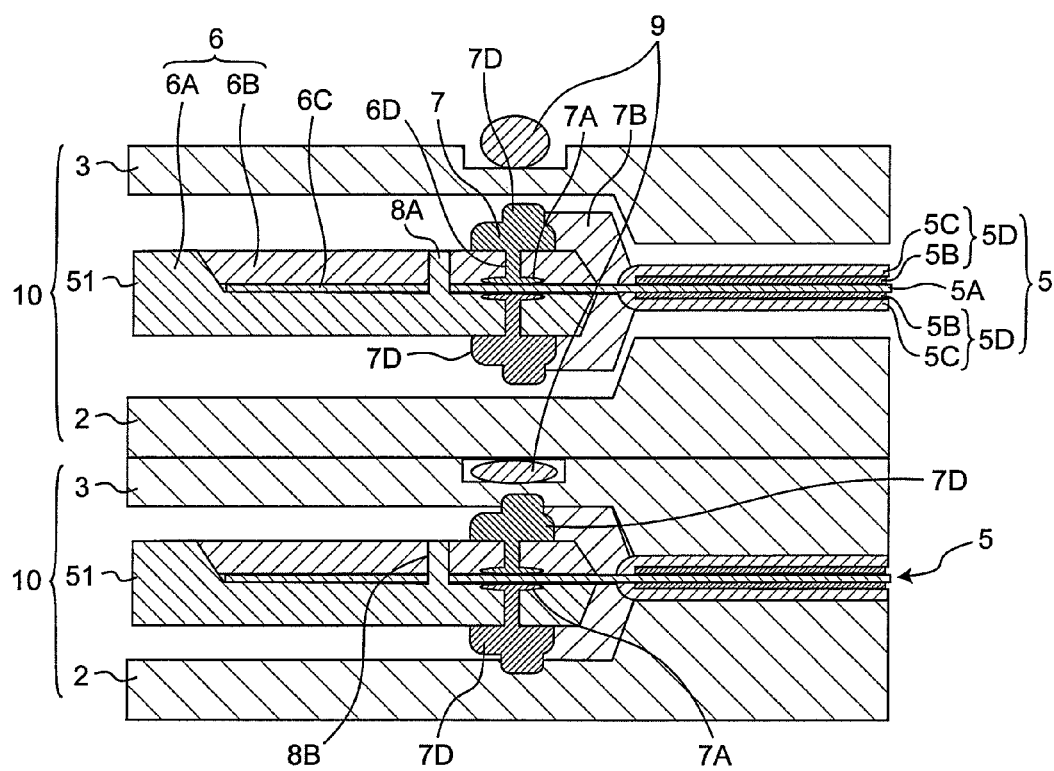
FIG. 11 is a partially exploded sectional view taken along the laminate section C-C' of the cell of FIG. 8.
Figure 12:
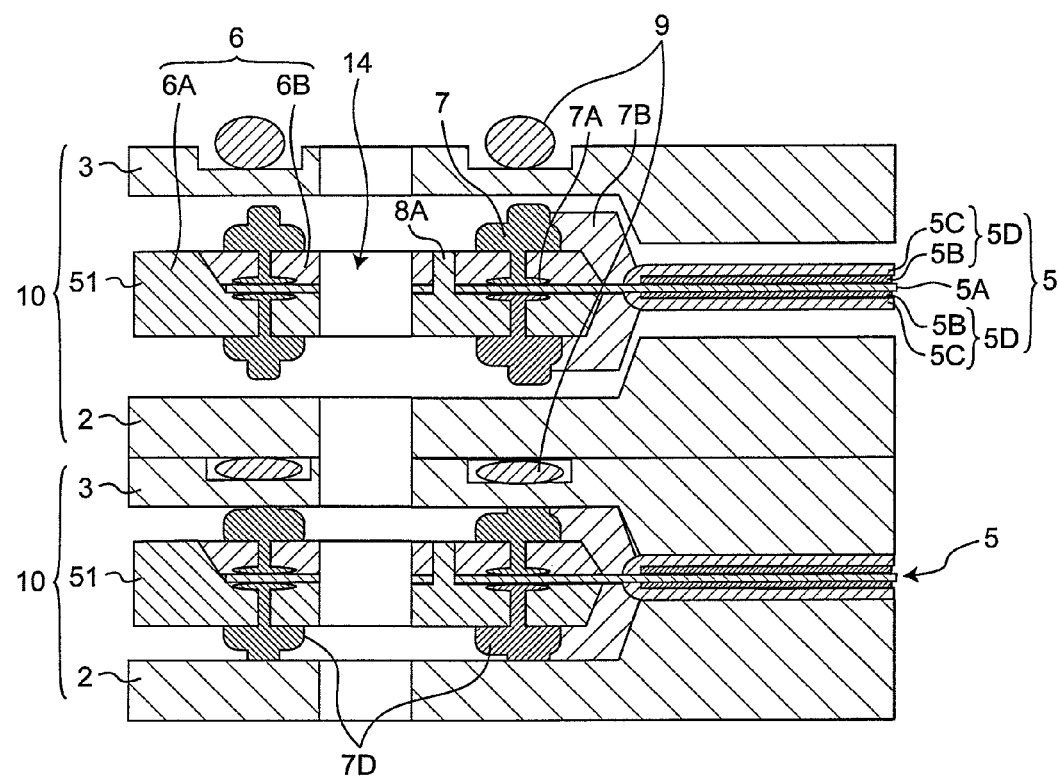
FIG. 12 is a partially exploded sectional view taken along the laminate section D-D' of the cell of FIG. 8.

The invention is not limited to the above embodiment but allowed to be implemented in various modes. For example, a schematic plan view of an electrode-membrane-frame assembly 51 according to the second embodiment of the invention is shown in FIG. 8. A top view of the first frame body is shown in FIG. 9, and a top view of the second frame body is shown in FIG. 10. Further, a sectional view taken along the line C-C' of the electrode-membrane-frame assembly 51 of FIG. 8 is shown in FIG. 11, and a sectional view taken along the line D-D' is shown in FIG. 12. In the electrode-membrane-frame assembly 51 of the second embodiment, same components as those of the first embodiment are designated by same reference numerals, and no description is provided therefor.

As is apparent from FIGS. 8, 9, 10, 11 and 12, the electrode-membrane-frame assembly 51 of the second embodiment differs from that of the first embodiment in that the gasket 7 does not have the double pile structure but have a single pile structure (see particularly FIG. 11). Moreover, as shown in FIG. 12, in the electrode-membrane-frame assembly 51 of the second embodiment, the polyelectrolyte membrane 5A extends to positions where various manifold holes (e.g., 14) are formed. Therefore, the through holes 6D and the gas cross-leaking preventing part 7A are arranged to cover the entire peripheries of the various manifold holes for the purpose of reliably sealing the peripheries.

Also, in the structure of the second embodiment as described above, an effect similar to that of the first embodiment can be obtained, and electrode-membrane-frame assemblies having the advantages of reliable sealing performance and manifold forming can be manufactured with high yield. Moreover, due to the single pile structure of the gasket in the structure of the second embodiment, the dimensions of the outer peripheral portions of the separators can be reduced, and this allow the separator size to be reduced and further allows the fuel cell stack to be reduced in size.

Each of the above embodiments is described on the following case. The fitting structure (or engaging structure) of the ribs 8A and the holes 8B such that the ribs 8A of the first frame body 6A are fitted into (or engaged with) the holes 8B of the second frame body 6B is adopted. With this arrangement, the first frame body 6A and the second frame body 6B are engaged with each other, and the engagement of both of them is made releasable, so that the MEA 5 is held by the first frame body 6A and the second frame body 6B. That is, the fitting structure or engaging structure is described above on the case where it is adopted as one example of holding means for releasably holding the MEA 5. However, the invention is not limited only to this.

Figure 15:
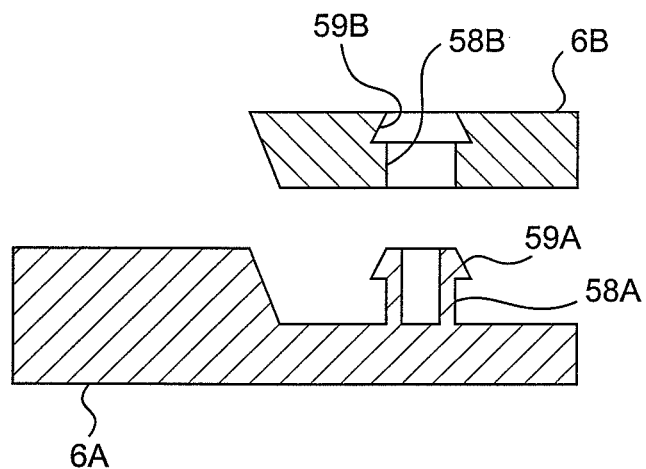
FIG. 15 is a schematic view showing a fitting structure according to a modification example of the first embodiment.

For example, the fitting structure or engaging structure is not limited to the form of projections and holes, and various mechanical fitting structures as conventionally employed can be adopted. Further, in the fitting structure or engaging structure as described above, as shown in the schematic view of FIG. 15, fitting structures (or engaging structures) 59A and 59B such that the fitting structure (or engaging structure) can be released while reinforcing the engaging state (fitting state) of the ribs 58A and holes 58B can also be adopted.

Moreover, the holding means for releasably holding the MEA 5 is only required to be means that concurrently have the function to hold the peripheral edge portion of the MEA 5 by the first and second frame bodies 6A and 6B and maintaining the held state and the function to release the held state and separate the MEA 5 when release of the holding is demanded, and means in various forms can be adopted. For example, it is also acceptable to make the engagement between the first and second frame bodies 6A and 6B reliable by using members other than the first and second frame bodies 6A and 6B. For example, a bolt for engagement, a pin-shaped member and so on can be employed as the member, i.e., the engagement member.

Moreover, although the gasket 7 (e.g., the inner gasket 7D and the outer gasket 7E) is formed on the first frame body 6A and the second frame body 6B according to the descriptions of the above embodiments, the invention is not limited only to the case. The gasket 7 is only required to be placed between the separators 2 and 3 and the respective frame bodies 6A and 6B. For example, it may be a case where the gasket 7 is formed on the surfaces of the separators 2 and 3 or a case where the gasket 7 exists as a member separated from the separators 2 and 3 and the frame bodies 6A and 6B. That is, a construction such that the gasket 7 is not formed on the surfaces of the first and second frame bodies 6A and 6B can also be adopted.

Moreover, various materials such as thermosetting resin materials, ceramic materials and so on can be used besides the thermoplastic materials as the formation materials of the first frame body 6A and the second frame body 6B.

Moreover, by adopting the structure of the electrode-membrane-frame assembly 1 (or 51) of the above embodiments, it is possible to inspect whether the electrode-membrane-frame assembly 1 is good or not after the electrode-membrane-frame assembly 1 is manufactured. When it is determined that the assembly is defective as the result of inspection, it is possible to release the mutual fitting of the first frame body 6A and the second frame body 6B and to separate the MEA 5 in the electrode-membrane-frame assembly 1 that is determined to be defective. When the thus-separated MEA 5 itself is not defective, another electrode-membrane-frame assembly 1 can be manufactured by reusing the MEA 5.

It is to be noted that, by properly combining the arbitrary embodiments of the aforementioned various embodiments, the effects possessed by them can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The disclosures of Japanese patent applications No. 2007-153732 filed on Jun. 11, 2007, including specification, drawings and claims, and No. 2008-128624 filed on May 15, 2008, including specification, drawings and claims are incorporated herein by reference in its entirety.

The invention can interrupt the flow of the fuel gas and the oxidizer gas at the peripheral edges of the MEA in the assembled state of the polyelectrolyte fuel cell. Further, the use efficiency of the fuel gas and the oxidizer gas can be improved, and the manufacturing yield can be improved. Therefore, the invention is useful as a fuel cell for use in cogeneration systems, electric cars and so on.

What is claimed is:

1. An electrode-membrane-frame assembly for a polyelectrolyte fuel cell, the assembly comprising:
    a membrane electrode assembly comprising a pair of electrode layers, a polyelectrolyte membrane with a peripheral edge portion, a first side surface and a second side surface, the peripheral edge portion of the polyelectrolyte membrane having a first surface on the first side surface of the polyelectrolyte membrane and a second surface on the second side surface of the polyelectrolyte membrane, and a first electrode layer in the pair of electrode layers being placed on the first side surface of the polyelectrolyte membrane inside the first surface of the peripheral edge portion, a second electrode layer in the pair of electrode layers being placed on the second side surface of the polyelectrolyte membrane inside the second surface of the peripheral edge portion, and the pair of electrode layers joined to the polyelectrolyte membrane so as to expose the peripheral edge portion of the polyelectrolyte membrane;
    a first frame body positioned on the first surface of the peripheral edge portion of the polyelectrolyte membrane; and
    a second frame body positioned on the second surface of the peripheral edge portion of the polyelectrolyte membrane, and releasably holding the peripheral edge portion of the polyelectrolyte membrane between the first frame body and the second frame body, wherein
    a through hole is formed at the peripheral edge portion of the polyelectrolyte membrane,
    a projection is disposed on the first frame body,
    an engagement hole is disposed in the second frame body,
    the projection of the first frame body is releasably engaged with the engagement hole of the second frame body so as to penetrate through the through hole of the polyelectrolyte membrane,
    a first membrane sealing member and a second membrane sealing member are disposed on membrane-side surfaces of the first frame body and the second frame body, respectively, such that the first membrane sealing member and the second membrane sealing member directly contact the membrane-side surfaces of the first frame body and the second frame body, respectively, each of the membrane-side surfaces facing the peripheral edge portion of the polyelectrolyte membrane, and each of the first and second membrane sealing members provides sealing between a respective membrane-side surface and the peripheral edge portion of the polyelectrolyte membrane, and
    the assembly is configured to be placed between two separators so as to become an electric cell module.

2. The electrode-membrane-frame assembly for a fuel cell as defined in claim 1, wherein
    the second frame body has a stepped portion having a bottom surface on which the peripheral edge portion of the polyelectrolyte membrane is positioned, and the first frame body is positioned on the stepped portion via the peripheral edge portion of the polyelectrolyte membrane.

3. The electrode-membrane-frame assembly for a fuel cell as defined in claim 2, further comprising:
    an outer peripheral side sealing member for sealing between the first and second separators, the outer peripheral side sealing member being placed on two surfaces of the second frame body, each of the two surfaces being located on an outer peripheral side of the stepped portion.

4. The electrode-membrane-frame assembly for a fuel cell as defined in claim 1, wherein
    the first and second frame bodies are formed of a resin material.

5. A polyelectrolyte fuel cell having one or a plurality of layers of electric cell modules comprising:
    the electrode-membrane-frame assembly as defined in claim 1; and
    the first and second separators being positioned to hold the electrode-membrane-frame assembly therebetween.

6. A manufacturing method of an electrode-membrane-frame assembly for a polyelectrolyte fuel cell constituting an electric cell module in the fuel cell by being held between a pair of separators, the electrode-membrane-frame assembly including a membrane electrode assembly comprising a polyelectrolyte membrane with a peripheral edge portion, a first side surface and a second side surface, and a pair of electrode layers, the peripheral edge portion of the polyelectrolyte membrane having a first surface on the first side surface of the polyelectrolyte membrane and a second surface on the second side surface of the polyelectrolyte membrane, and a first electrode layer in the pair of electrode layers being placed on the first side surface of the polyelectrolyte membrane inside the first surface of the peripheral edge portion, a second electrode layer in the pair of electrode layers being placed on the second side surface of the polyelectrolyte membrane inside the second surface of the peripheral edge portion, and the pair of electrode layers joined to the polyelectrolyte membrane so as to expose the peripheral edge portion of the polyelectrolyte membrane, the method comprising:

preparing a membrane electrode assembly by forming a through hole at the peripheral edge portion of the polyelectrolyte membrane, preparing a first frame body by forming a projection on a membrane-side surface, and a second frame body by forming an engagement hole to engage the projection on a membrane-side surface, forming a first membrane sealing member and a second membrane sealing member positioned on membrane-side surfaces of the first frame body and the second frame body respectively, such that the first membrane sealing member and the second membrane sealing member directly contact the membrane-side surfaces of the first frame body and the second frame body, respectively, placing the first frame body on a first surface at a peripheral edge portion of the polyelectrolyte membrane, placing the second frame body on a second surface at the peripheral edge portion of the polyelectrolyte membrane, releasably engaging the engagement hole of the second frame body with the projection of the first frame body so as to penetrate through the through hole of the polyelectrolyte membrane and releasably holding the peripheral edge portion of the polyelectrolyte membrane by the first and second frame bodies, and sealing between the respective membrane-side surfaces of the first and second frame bodies and the peripheral edge portion of the polyelectrolyte membrane by bringing the two membrane sealing members into contact with the peripheral edge portion of the polyelectrolyte membrane, thereby forming an electrode-membrane-frame assembly.

7. A polyelectrolyte fuel cell manufacturing method for manufacturing a fuel cell by forming an electric cell module such that one pair of separators are placed to hold the electrode-membrane-frame assembly formed by the manufacturing method as defined in claim 6 therebetween and stacking one or a plurality of electric cell modules.

8. The electrode-membrane-frame assembly for a fuel cell as defined in claim 1, further comprising:

a first separator sealing member being placed on a separator-side surface of the first frame body and being configured to seal between the first frame body and the first separator; and a second separator sealing member being placed on a separator-side surface of the second frame body and being configured to seal between the second frame body and the second separator.

\* \* \* \* \*

UNITED STATES PATENT AND TRADEMARK OFFICE
CERTIFICATE OF CORRECTION

PATENT NO. : 8,642,230 B2
APPLICATION NO. : 12/136312
DATED : February 4, 2014
INVENTOR(S) : Tsutomu Kawashima Page 1 of 1

It is certified that error appears in the above-identified patent and that said Letters Patent is hereby corrected as shown below:

On the Title Page:

In Item (75), line 4, "Atsushi Murata, Osaka (JP); Takashi" should read -- Atsushi Murata, Shiga (JP); Takashi --

Signed and Sealed this
Twenty-ninth Day of April, 2014

Michelle K. Lee
*Deputy Director of the United States Patent and Trademark Office*